Nov. 27, 1951  P. C. JURS  2,576,516
PRESSURE RELIEF VALVE
Filed May 19, 1947  2 SHEETS—SHEET 1
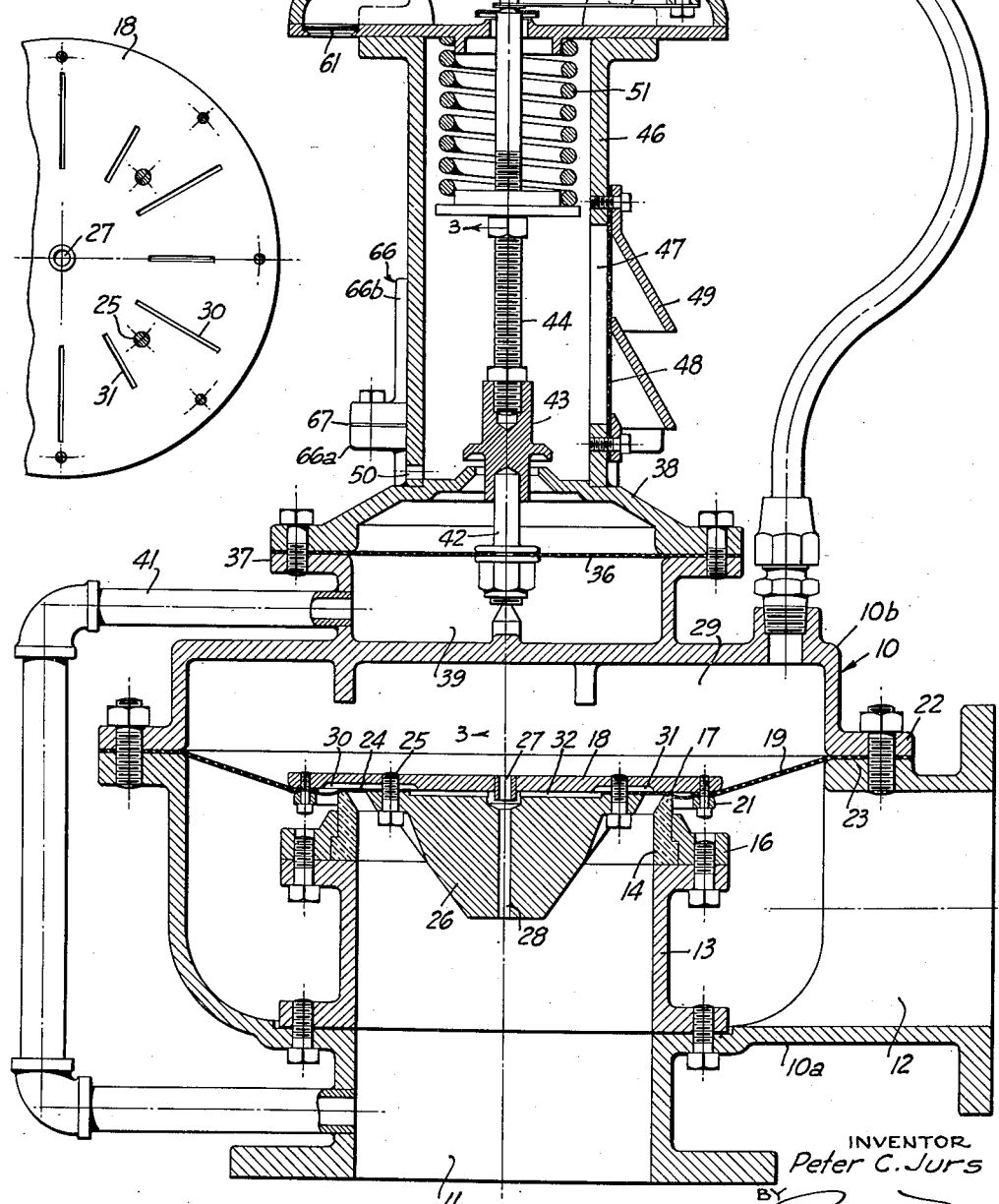
INVENTOR.
Peter C. Jurs
BY
ATTORNEY Nov. 27, 1951     P. C. JURS     2,576,516
PRESSURE RELIEF VALVE
Filed May 19, 1947     2 SHEETS—SHEET 2
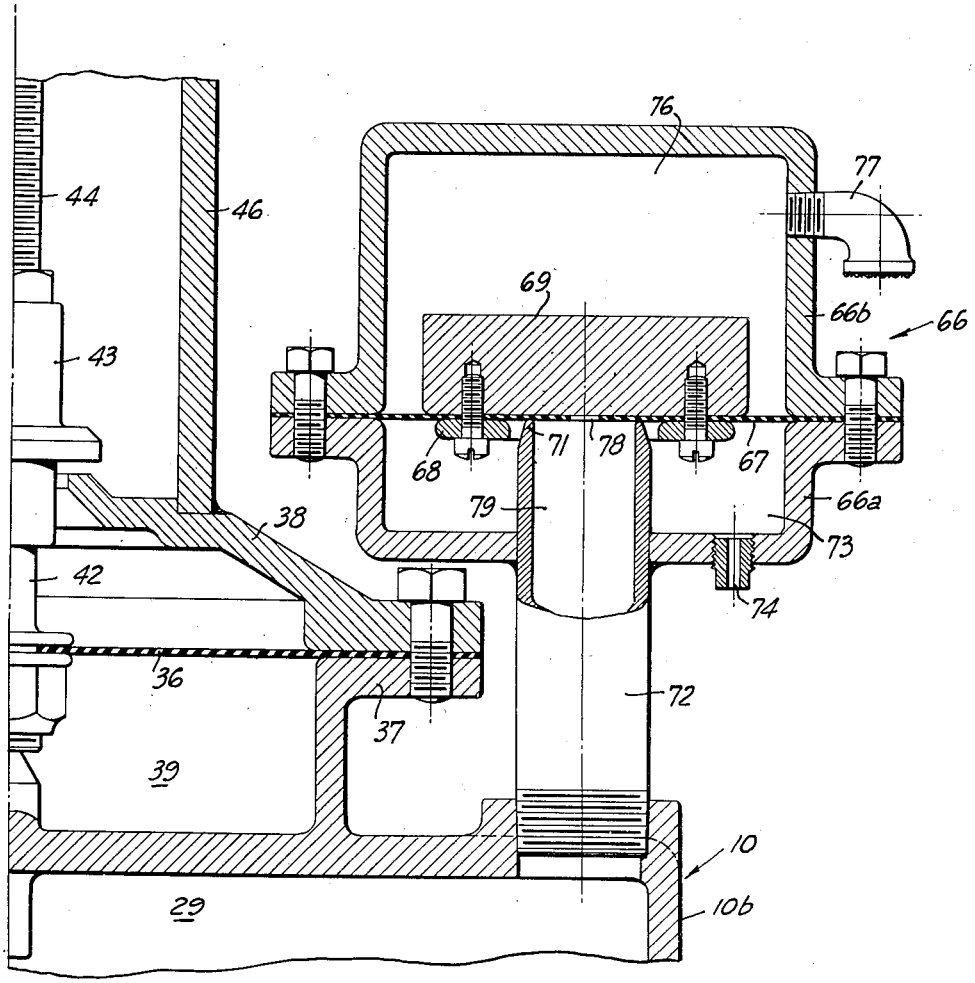
FIG_3_
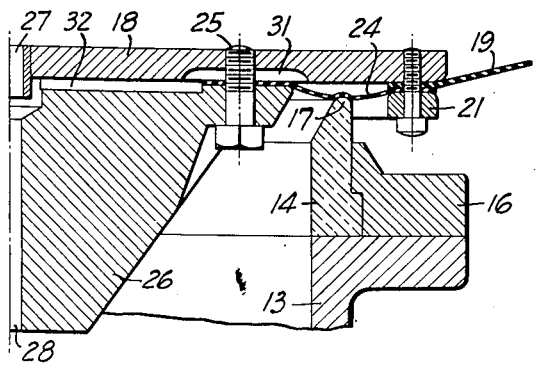
FIG_4_
INVENTOR.
Peter C. Jurs
BY
ATTORNEY Patented Nov. 27, 1951

2,576,516

UNITED STATES PATENT OFFICE 2,576,516

PRESSURE RELIEF VALVE

Peter C. Jurs, Oakland, Calif., assignor to Shand and Jurs Company, Berkeley, Calif., a partnership Application May 19, 1947, Serial No. 748,981

2 Claims. (Cl. 137—53)

This invention relates generally to devices for use with pressure systems for the purpose of relieving fluid pressure in the event the pressure reaches a predetermined value. The device as disclosed herein is particularly adapted for use with storage tanks of the type employed for the storage of volatile hydrocarbon products, whereby the tank is protected against an abnormally high or unsafe pressure.

It is a general object of the invention to provide an improved device of the above character which incorporates both main and pilot valve means, and which is characterized by its ability to maintain a good gastight seal for pressures below the pressure value for which the device is set to open.

A further object of the invention is to provide a device of the above character which will insure opening of the main valve means irrespective of failure of the pilot valve means to operate as normally intended. In this connection the present invention is characterized by the use of a relief valve in addition to the regular pilot valve means, and which relief valve is employed for the purpose of causing opening of the main valve means when the inlet or tank pressure exceeds the set maximum pressure by a predetermined amount.

Another object of the invention is to provide an improved main valve member for use in a pressure relief regulator of the above type, and which functions to maintain a good gastight seal over a wide range of pressures, without the necessity of employing accurately machined parts.

Further objects of the invention will appear from the following description in which the preferred embodiment has been set forth in detail in conjunction with the accompanying drawing.

Referring to the drawing:

Figure 1 is a side elevational view in section illustrating a pressure relief regulating device incorporating the present invention.

Figure 2 is a detail illustrating the lower face of the rigid member which extends over the main valve seat.

Figure 3 is an enlarged detail in section illustrating the supplemental relief valve used with the device of Figure 1, and the manner in which the same is connected to the body of the main valve.

Figure 4 is a detail illustrating the position of parts of the main valve means for a normal pressure below the set pressure.

The relief regulating device illustrated in Figure 1 consists of a body 10 formed of the separable parts 10a and 10b. The inlet passage 11 of the body is adapted to be connected to a tank or other pressure system to be protected, and the outlet passage 12 can be vented directly to the atmosphere, or to a system to which gas is delivered when pressure is being relieved. Within the body there is a conduit extension 13, which provides a continuation of the inlet passage 11, and which serves to mount a horizontally disposed seat ring 14. The seat ring is held in place by suitable means such as the clamping ring 16, and may be made of suitable metal. The upper end surface 17 of the seat ring is preferably rounded as illustrated in order to avoid injury to the flexible member which seals against the same, as will be presently described.

The main valve means which cooperates with the seat ring 14 consists of a rigid disc 18 which extends completely across the seat, and which is operatively connected to a flexible diaphragm 19. In the type of construction illustrated the diaphragm 19 has its inner peripheral portion clamped and sealed to the outer peripheral portion of the disc 18, as by means of clamping ring 21, and the outer peripheral margin of the diaphragm 19 is clamped between a flange 22 formed on the body part 10b, and an annular shoulder 23 formed on the main body part 10a.

Associated with and underlying the rigid member 18, there is a flexible member 24 which is adapted to seal upon the seat surface 17. The outer peripheral margin of the flexible member 24 is clamped and sealed to the outer peripheral edge of the member 18 by means of the same clamping ring 21. If desired members 19 and 24 can be made integral, that is of one piece of material.

Within the ring 14 there is a weighting member 26 which can be conical shaped, and which is shown clamped to the rigid member 18 by screws 25. The inner peripheral margin of the member 24 is shown clamped between members 26 and 18. Members 18 and 26 are shown provided with connecting ducts 27 and 28 whereby the closed chamber 29 above the diaphragm 19 is placed in restricted communication with the inlet passage 11.

With the flexible member 24 clamped as illustrated it will be noted that a considerable portion of the same is free to flex, and that such portion extends outwardly beyond the valve seating surface 17, and also inwardly toward the area of clamping engagement with member 18. The space between flexible member 24 and the adjacent portion of the rigid member 18 is in continuous communication with the inlet. For this purpose the lower face of the rigid member 18 is provided with grooves 30 and 31 which extend radially and which connect at their inner ends with grooves 32 in the upper face of the weighting member 26. The latter grooves communicate with the ducts 27 and 28 as illustrated.

As will be presently explained in greater detail, with the main valve construction described above, the flexible member 24 makes sealing contact with the seating surface 17 for normal tank pressures, and at the same time there is a floating action in that rigid member 18 and weighting member 26 are carried on a pneumatic cushion established between the flexible member 24 and the adjacent portion of the rigid member 18.

In addition to the parts described above I provide pilot valve means serving to vent gas from the chamber 29 when the inlet pressure attains a predetermined maximum value. The pilot valve means illustrated consists of a flexible diaphragm 36 which has its peripheral portion clamped between the flange 37 and the cover plate 38. Flange 37 is carried upon the top part 10b of the main body, and the space 39 provided below the diaphragm 36 is in direct communication with the tank or the inlet 11, as by means of pipe 41. A thrust stud 42 is attached to the central portion of diaphragm 36, and is seated within a coupling 43, which in turn is carried by the lower end of the threaded push rod 44. A sleeve-like housing 46 serves to shroud the rod 44, and is permanently attached at its lower end to cover plate 38. It is desirable that this housing be provided with vent openings 47 to the atmosphere, and as illustrated these openings can be covered by a screen 48, and protected by louvers 49. Also the housing is provided with a drainage duct 50. A compressing spring 51 normally provides a loading force, urging rod 44 downwardly. The upper end of the housing 46 supports a hollow body 52 through which the upper end of the valve rod 44 extends. The body 52 provides a stationary valve seat 53 engaged by the pilot valve member 54. This valve member is generally guided and urged toward closed position by the compression spring 56. A cap 57 encloses the valve member, and forms a bore for receiving the spring 56. Space 58 within the cap 57 is connected to the chamber 29 by pipe 59.

The interior of the body 52 is vented to the atmosphere through the screened opening 61. Also within this body are one or more spring strips 62 which have their outer ends anchored to the body 52, and their inner ends attached to the valve rod 44 as illustrated. Thus the valve rod is retained properly aligned without the use of conventional guide bushings. The upper end of the valve rod can be provided with simple abutting engagement with the valve member 54 as illustrated.

The pilot valve means described above operates as follows: Inlet pressure is continuously transmitted to the chamber 39 below the pilot valve diaphragm 36. However, compression of the spring 51 normally applies sufficient downward force to the valve rod 44 whereby the valve member 54 remains closed. When the inlet pressure attains the predetermined maximum value for which the device is set, the pressure below diaphragm 36 forces the rod 44 upwardly to open the valve member 54. This serves to vent the chamber 29 to the atmosphere by way of pipe 59, through the orifice of valve seat 53, the interior of body 52 and the screened opening 61. A resulting drop in pressure in chamber 29 causes the main valve to open as will be presently described in greater detail. Opening of the main valve means relieves the pressure of the tank connected to inlet 11, and when this pressure has dropped to a predetermined value the pilot valve automatically closes whereby inlet pressure is again built up in chamber 29, and the main valve means again closes.

Irrespective of the care taken in the construction of the pilot valve means, it may at times fail to operate due for example to a rupture of the diaphragm 36. In such event the pilot valve would fail to open at the set maximum pressure, and the tank pressure may then continue to rise and cause serious damage. In order to overcome this hazard an additional relief valve is used as illustrated in Figure 3. The preferred type of this relief valve is disclosed and claimed in my co-pending application Ser. No. 748,982, filed of even date. It consists of a body 66 formed of the separable parts 66a and 66b. A flexible diaphragm member 67 has its outer peripheral margin clamped and sealed between the two body parts as illustrated, and is also secured by clamping ring 68, to the lower face of a weight 69. Part of the diaphragm 67 extending inwardly of the ring 68 is engaged by the annular seat 71, which is formed upon the upper end of the pipe or tube 72. Pipe 72 is sealed with respect to the body part 66a, and is extended to form a convenient connection through the top wall of the body part 10b.

The space 73 surrounding the seat 71 and below diaphragm 67 is vented to the atmosphere through the flow restricting orifice 74. The space 76 above the diaphragm 67 is freely vented to the atmosphere through the screened pipe fitting 77.

Diaphragm 67 is formed of some suitable material capable of withstanding vapors to which it may be subjected and also capable of forming a good fluidtight seal with the seat 71 without sticking. Various fabric reinforced synthetic rubbers are suitable for this purpose. The center of the diaphragm is provided with an opening 78, whereby that portion of the diaphragm lying inwardly of the clamping ring 68 has its upper surface in free communication with the inlet, which in this instance is the passage 79 through the pipe 72. Therefore inlet gas pressure serves to balloon that portion of the diaphragm lying inwardly of the clamping ring 68 downwardly to resiliently press the same into sealing engagement with the valve seat, and to float the loading weight 69 upon a pneumatic cushion. This floating action occurs over a range of normal pressures to which the tank being protected is generally subjected.

When the tank pressure exceeds by a predetermined amount the pressure for which the pilot valve means is set to vent, the pressure acting upwardly upon the loading weight 69 causes initial slight unseating of the diaphragm with respect to the valve seat 71, whereby gas from chamber 29 is vented through passage 79, chamber 73, and orifice 74. Because of the restricted venting of orifice 74 there is a rapid build up of pressure in chamber 73 which acts upon that area of the diaphragm extending outwardly from the seat 71 to suddenly force the diaphragm to full opening with respect to the valve seat 71. Likewise rapid building up of pressure in chamber 73 insures a rapid opening as distinguished from a regulated or throttling action which otherwise might occur. While orifice 74 enables building up of considerable pressure in chamber 73, it must be of such a size that it is capable of causing a desired drop of pressure in chamber 29, taking into account the fact that this chamber is likewise in communication with the inlet 11, through the restricted ducts 27 and 28. Furthermore the drop in pressure in chamber 73 under such conditions should be ample to effect opening of the main valve. Thus in general the ducts 27 and 28 should be smaller in effective flow area than the orifice 74.

The relief valve of Figure 3 closes when the tank pressure has dropped to a value well below the pressure for which the pilot valve means is set. Closing of the relief valve is followed by closing of the main valve means, due to the building up of pressure in chamber 29 as previously described.

The ballooning action of the flexible member 24 of the main valve means for normal tank pressures is illustrated in Figure 4. Thus that portion of flexible member 24 which is free to flex downwardly forms a seal upon the valve surface 17, and there is a virtual pneumatic cushion between this member and the rigid member 18. It will be evident that the high degree of flexibility afforded by member 24 insures conformation with and a perfect gastight seal upon the seating surface, irrespective of inaccurate machining of the rigid member 18, and irrespective of some warpage which may occur with respect to the seating ring. Actual tests show that the sealing engagement afforded in this manner is practically completely gastight over a wide range of normal tank pressures. This is because the pneumatic pressure applied between the flexible member 24 and the rigid member 18 increases together with an increase in the loading pressure, whereby the desired cushioning and ballooning action is maintained throughout the desired pressure range.

The safety relief valve described with reference to Figure 3 likewise maintains a substantially perfect gastight seal for all normal pressures. In practice it would be difficult if not impossible to utilize conventional relief valves for this purpose, because of the difficulties involved in maintaining a desired gastight seal. It is well known that conventional relief valves are unsatisfactory in maintaining a good reliable gastight seal, and that they tend to permit increased leakage as the pressure rises to a value near the value for which the valve is set to open.

I claim:

1. In a pressure relief regulator of the type including main and pilot valve means, and in which the pilot valve means is operated by fluid pressure to vent the operating chamber of the main valve means, a body having an inlet passage adapted for connection with a pressure system and also having an outlet passage, an annular horizontal valve seat formed in the body and having a passage through the same serving to connect the inlet and outlet passages, a vertically movable rigid member extending over the seat, a flexible sealing member having an outer peripheral portion of the same secured to and sealed with respect to the rigid member in a region spaced outwardly from said seat, said flexible member being free to move relative to the rigid member over a substantial annular area which extends over said seat and for substantial distances outwardly and inwardly of the same, said flexible member and said rigid member serving to define a space between the same which is in communication with the inlet passage whereby for a range of normal pressures applied to the inlet passage below a given maximum relief pressure said flexible member is pneumatically pressed into sealing engagement with the seat with floating action of the rigid member, a diaphragm carried by the body and having an operative connection with the rigid member, the body forming a closed operating chamber on one side of the diaphragm, the other side of the diaphragm being in communication with the outlet passage, and means providing restricted communication between the inlet passage and said chamber, said operating chamber being adapted to be vented by said pilot valve means when the inlet pressure attains said maximum relief pressure.

2. In a pressure relief regulator of the type including main and pilot valve means, and in which the pilot valve means is operated by fluid pressure to vent the operating chamber of the main valve means, a body having an inlet passage adapted for connection with the pressure system and also having an outlet passage, an annular horizontal valve seat formed in the body and having a passage therethrough serving to connect the inlet and outlet passages, a vertically movable rigid member extending over said seat, a flexible sealing member having an outer peripheral portion of the same secured to and sealed with respect to the rigid member in a region spaced outwardly from said seat and having an inner peripheral portion secured to the rigid member in a region spaced inwardly from said seat, the flexible and rigid members defining a space between the same which is in communication with the inlet passage and which extends between the regions where the flexible member is secured to the rigid member, whereby for a range of normal pressures applied to the inlet below a given maximum pressure said flexible member is pneumatically pressed into sealing engagement with the seat with floating action of the rigid member, a diaphragm having its outer periphery secured to the body and having its inner periphery attached and sealed to the outer margin of the rigid member, the body forming a closed operating chamber on one side of the diaphragm, the space on the other side of the diaphragm being in communication with the outlet, and means providing restricted communication between the inlet and said chamber whereby inlet pressure in said chamber serves to urge the diaphragm and said rigid member toward the seat, said operating chamber being adapted to be vented by said pilot valve means when the inlet pressure attains the aforesaid maximum relief pressure.

PETER C. JURS.

REFERENCES CITED

The following references are of record in the file of this patent:

UNITED STATES PATENTS

| Number | Name | Date |
|---|---|---|
| 311,147 | Richardson | Jan. 20, 1885 |
| 582,445 | Tippett | May 11, 1897 |
| 763,208 | Robinson | June 21, 1904 |
| 1,988,026 | Unger | Jan. 15, 1935 |
| 2,316,649 | Jurs | Apr. 13, 1943 |
| 2,479,737 | Garretson | Aug. 23, 1949 |